United States Patent [19]
Guyon

[11] Patent Number: 5,486,101
[45] Date of Patent: Jan. 23, 1996

[54] DEVICE FOR CLAMPING A HALF-MOULD ONTO A PLATEN OF A MOULDING MACHINE, AND MOULDING MACHINE FITTED WITH SUCH A DEVICE

[75] Inventor: Jean-François Guyon, Groissiat, France

[73] Assignee: Billion S.A., Bellignat, France

[21] Appl. No.: 264,619

[22] Filed: Jun. 23, 1994

[30] Foreign Application Priority Data

Jun. 23, 1993 [FR] France .................................. 93 07647

[51] Int. Cl.⁶ ..................................................... B29C 33/30
[52] U.S. Cl. ........................................ 425/192 R; 425/195
[58] Field of Search ................................ 425/183, 192 R, 425/195, 451.9

[56] References Cited

U.S. PATENT DOCUMENTS

| | | | |
|---|---|---|---|
| 4,116,599 | 9/1978 | Ruegg | 425/192 R |
| 4,484,880 | 11/1984 | Schwarz | 425/192 R |
| 5,078,586 | 1/1992 | Holzschuh | 425/192 R |

FOREIGN PATENT DOCUMENTS

| | | |
|---|---|---|
| 0143878 | 6/1985 | European Pat. Off. . |
| 0286553 | 10/1988 | European Pat. Off. . |
| 2552366 | 3/1985 | France . |

*Primary Examiner*—James P. Mackey
*Attorney, Agent, or Firm*—Young & Thompson

[57] ABSTRACT

This clamping device (5) is of the type comprising a peg (6) which projects from the half-mold (2) and which is received in a recess (17) in the platen, and a clamping mechanism (5) including a transverse cylinder (9) and a wedge (8) deigned to interact with the peg in order to ensure the removable clamping of the half-mold. The clamping mechanism (5) comprises a bearing block (7) designed to be fixed at the entrance of the recess (17) and including, on the one hand, a passage (25) for the peg (6), and, on the other hand, an incline (24) for the bearing of the wedge (8), this incline being provided on that face of the block which points towards the recess in the platen. The peg (6) is axisymmetric with a widened head (14). The clamping device finds applicability in the injection-molding of plastics.

16 Claims, 3 Drawing Sheets

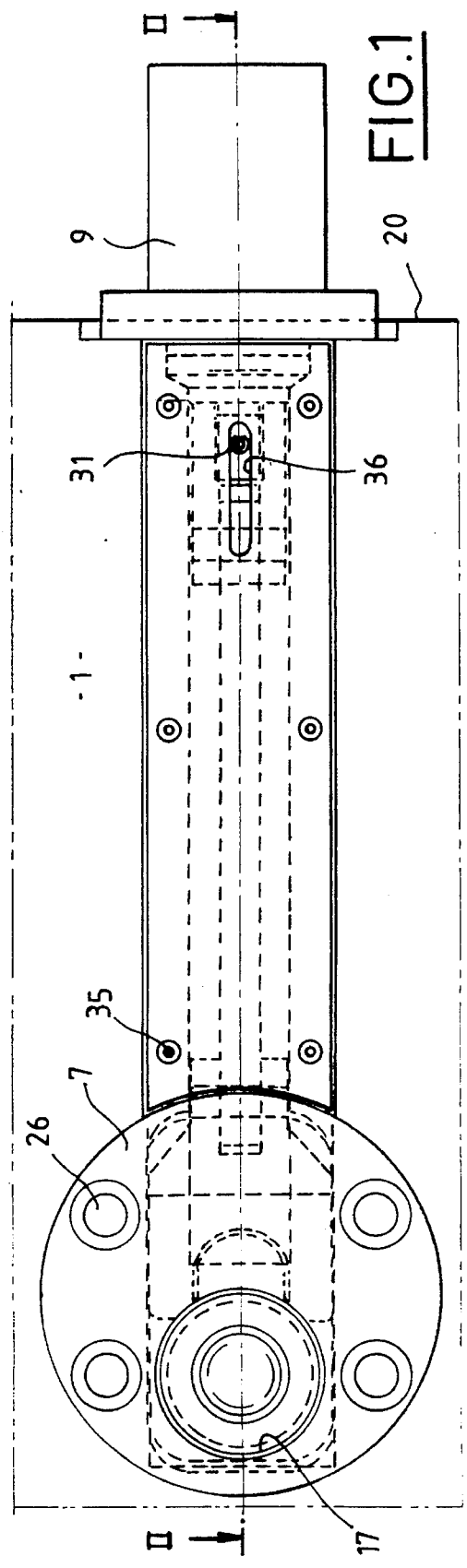
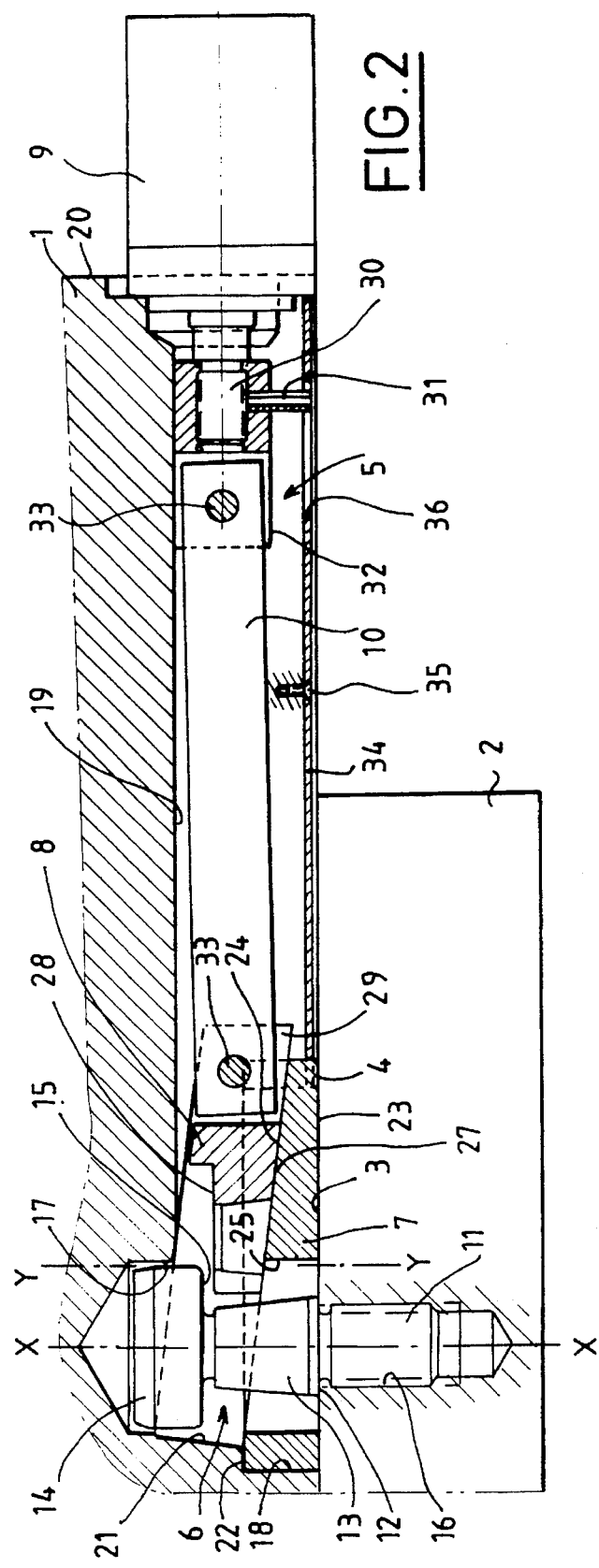

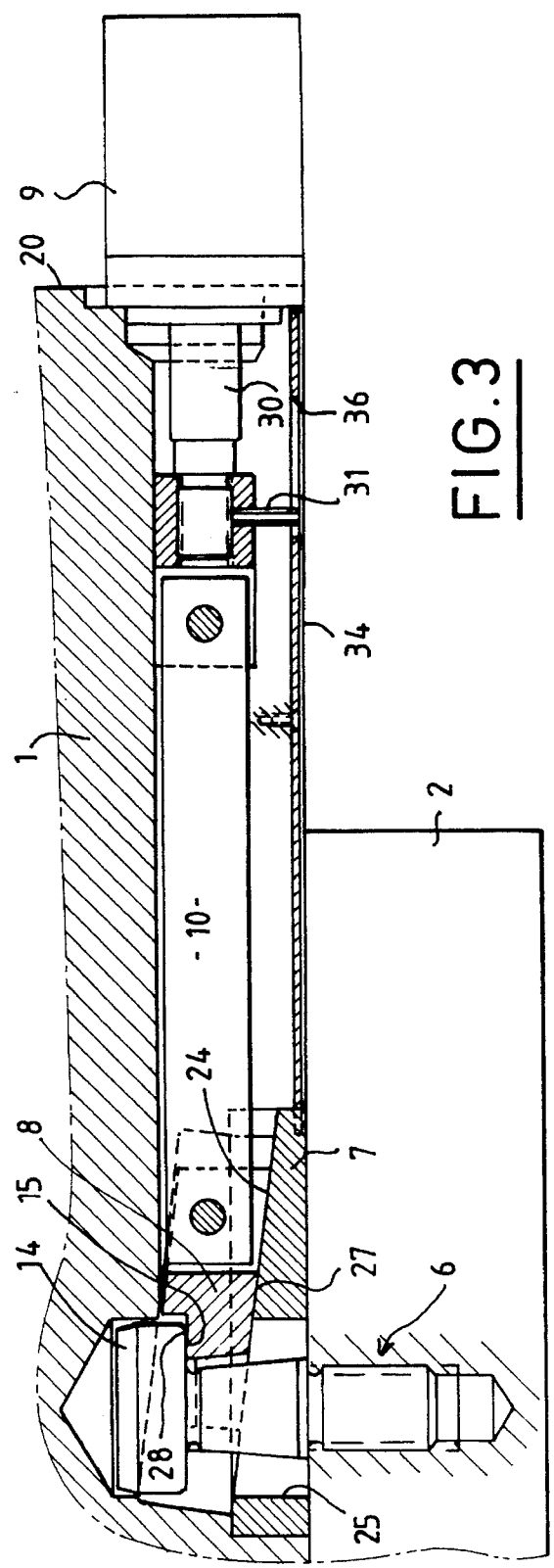
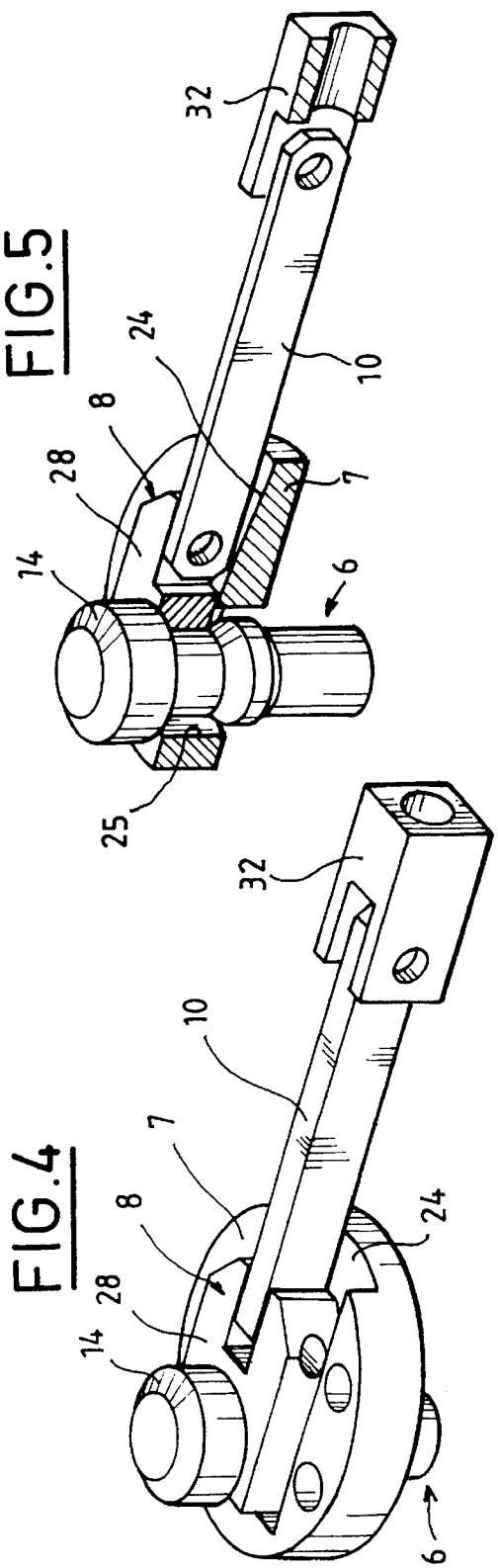

5,486,101

DEVICE FOR CLAMPING A HALF-MOULD ONTO A PLATEN OF A MOULDING MACHINE, AND MOULDING MACHINE FITTED WITH SUCH A DEVICE

FIELD OF THE INVENTION

The present invention relates to a device for clamping a half-mould onto a platen of a moulding machine, of the type comprising a peg which projects from the half-mould and which is received in a recess in the platen, and a clamping mechanism including a transverse cylinder and a wedge designed to interact with the peg in order to ensure the removable clamping of the half-mould.

1. Background of the Invention

Numerous clamping devices of this type have been proposed, without an entirely satisfactory solution having been found.

The object of the invention is to provide a device which is particularly compact and economical to produce and which is easy to incorporate into the thickness of the platen.

2. Summary of the Invention

To this end, the subject of the invention is a clamping device of the abovementioned type, characterized in that the clamping mechanism comprises a bearing block designed to be fixed at the entrance of the recess and including, on the one hand, a passage for the peg, and, on the other hand, an incline for the bearing of the wedge, this incline being provided on that face of the block which points towards the recess in the platen, and in that the peg is axisymmetric and includes a widened head on the inner face of which the wedge acts.

This device may have one or more of the following characteristics:

- the passage of the bearing block is off-centered with respect to the block on that one of the sides of the latter which is closest to the central axis of the platen;
- the wedge has the form of a fork which is open towards the central axis of the platen;
- the clamping mechanism includes a link articulated, on one side, to the piston rod of the cylinder and, on the other side, to the wedge;
- the clamping mechanism includes a link which is guided in terms of translation, and of which the opposite end from the cylinder is slidingly mounted in a slit in the wedge, which slit is perpendicular to the axis of the link;
- the bearing block has a circular cross-section and fits into a conjugate spot face in the platen;
- the clamping mechanism is entirely contained within the thickness of the platen;
- the piston rod of the cylinder, or a member which is translationally connected to it, includes an index situated outside the contour of the half-mould and visible by looking through the platen.

A further subject of the invention is a moulding machine, particularly for the injection-moulding of a plastic, of which at least one platen includes at least one clamping device as defined hereinabove.

BRIEF DESCRIPTION OF THE DRAWINGS

Embodiments of the invention will now be described in relation to the appended drawings, in which:

FIG. 1 represents, in elevation, a clamping device according to the invention, in the position of rest;

FIG. 2 is a view taken in section on the line II—II of FIG. 1;

FIG. 3 is a view, similar to FIG. 2, but representing the clamping device in the active position;

FIG. 4 is a perspective view of the clamping device in the active position;

FIG. 5 is a view, similar to FIG. 4, but with a partial longitudinal section;

DETAILED DESCRIPTION OF THE INVENTION

Figure 6:
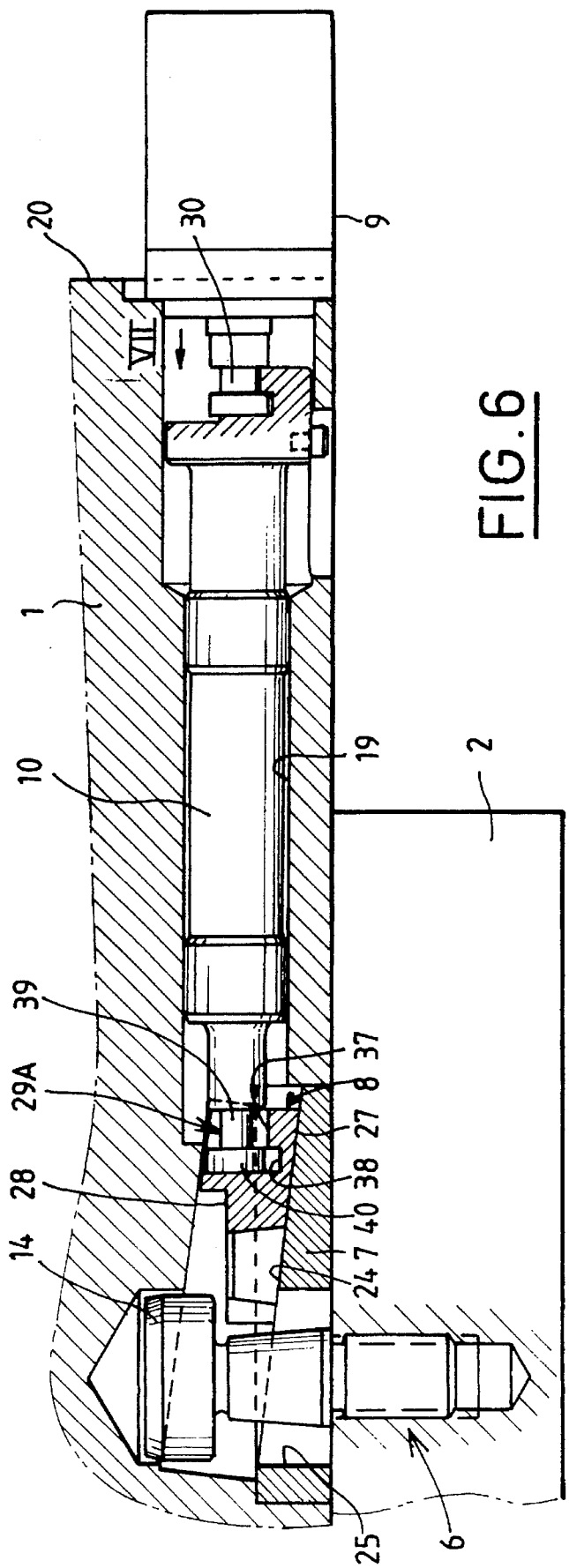
FIG. 6 is a view, similar to FIG. 2, of a variant.

FIGS. 1 and 2 represent the marginal zone of a vertical platen 1 of a machine for the injection-moulding of plastic, as well as a marginal zone of a half-mould 2 (not represented in FIG. 1) fixed removably to this platen. More precisely, a rear face 3 of the half-mould is clamped against a front face 4 of the platen by means of a clamping device 5, essentially made up of a peg 6, a bearing block 7, a wedge 8, a double-acting cylinder 9, and a transmission link 10.

In practice several identical devices 5 are provided, distributed around the periphery of the half-mould, around a central region (not visible in the drawings) of this half-mould and of the platen including an injection passage for the material to be moulded.

The peg 6 is axisymmetric about a horizontal axis X—X. It includes a threaded shank 11 delimited by a radial shoulder 12, an intermediate part 13 and a widened head 14 which exhibits a plane and vertical rear face 15. The shank 11 is screwed home into a tapped hole 16 formed in the face 3 of the half-mould, until the shoulder 12 comes into abutment against this face.

A blind bore 17 of axis X—X, of slightly greater diameter than the largest diameter of the peg 6 is hollowed from the face 4 of the platen, and a counterbore or spot face 18 of distinctly larger diameter, of axis Y—Y parallel to the axis X—X but offset towards the adjacent vertical face 20 of the platen with respect to this axis is machined to the entrance of the bore 17. In addition, a recess 19 of elongate shape, pointing horizontally, emerges on one side, in the bore 17 and, on the other side, on the lateral face 20, the recess 19 emerging moreover over its entire length on the face 4. Furthermore, a recess 21 of rectangular cross-section, wider than the bore 17, departs obliquely from the recess 19 and cuts right through this bore.

The bearing block 7 has the shape of a flat disc of circular cross-section matching that of the counterbore 18. This flat disc is defined by two plane and parallel faces, an inner one 22 and an outer one 23, and by a cut side 24, the width of which is of the order of half the diameter of the block 7 and which departs from the face 22 and extends more or less as far as half way up the flat disc. When the face 22 is in abutment against the bottom of the counterbore 18, the face 23 is in the same plane as the face 4, or slightly set back with respect to the latter. The block 7 is furthermore pierced with a circular hole 25 of axis X—X, and consequently off-centered, which emerges towards the outside on the face 23 and towards the inside on the cut face 24. The block 7 may be fastened into the counterbore 18 by means of four screws 26 (FIG. 1), the heads of which are recessed with respect to the face 23.

The wedge 8 has the form of a fork and is guided, in the recess 21, by the walls delimiting the cut face 24 on either side. The branches of the fork exhibit an oblique outer face 27 with the same slope as the face 24 of the block 7, and a vertical opposite inner face 28 parallel to the face 23. On the cylinder 9 side, the wedge forms a clevis 29.

The body of the cylinder 9 is fastened to the lateral face 20 of the platen. Its piston rod 30 carries a clevis 32, which carries an index 31 projecting towards the outside of the platen.

The link 10 is articulated by means of two vertical pins 33, on the one side in the clevis 29 of the wedge, and, on the other side, in that 32 of the cylinder. This link is entirely contained within the recess 19, which is closed by a removable plate 34 held by screws 35. This plate includes a median slit 36 pointing horizontally, which allows the index 31 to be seen.

When the half-mould 2 is fitted, the cylinders 9 are retracted, which brings the wedges 8 close to the bottom end of the inclines 24, the wedges then entirely freeing the geometrical envelope of the bores 17. This position can be checked by means of the indexes 31, which are close to the outer end of the slit 36.

When the half-mould is centered with respect to the platen, each peg 6 is centred on its bore 17. The half-mould is brought closer to the platen, so that each peg passes through a hole 25 and penetrates freely to the bottom of the bore 17 when the face 3 of the half-mould comes into contact with the face 4 of the platen. This situation is then that illustrated in FIGS. 1 and 2.

The cylinders 9 are then extended, which pushes the wedges 8 towards the heads 14 of the peg 6, riding up along the inclines 24. In the final clamping position of FIGS. 3 to 5, the vertical face 28 of each wedge bears on the vertical face 15 of the associated peg head 14. The indexes 31 are then close to the inner end of the slits 36.

Unclamping of the half-mould takes place simply by retracting the cylinders 9. In order to do that, it is possible, in a conventional manner, to use a pressure amplifier, the unclamping force to be developed generally being greater than the clamping force.

The clamping device 5 exhibits numerous advantages. In particular:

the device may easily be incorporated within the thickness of the platen, for the price of a few simple bits of machining;

the only surfaces which wear out are the surface 24 and the adjacent lateral surfaces of the block 7, the surfaces 27 and 28 and the adjacent lateral surfaces of the wedge, the surface 15 of the peg and the pins 33, and all these surfaces are on components which are removable and interchangeable, so that no remachining of the platen is necessary during the lifetime of the device;

by virtue of the forked form of the wedges and of the outward offset of the axis Y—Y with respect to the axis X—X, the machining of the platen remains limited to a very marginal zone on the latter, which leaves a great deal of space available in the central region of the platen for fitting the system for injecting the plastic.

Figure 7:
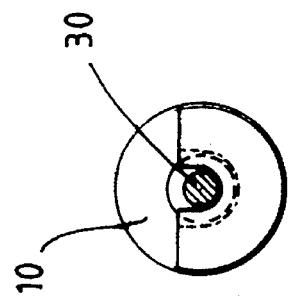
FIG. 7 is a detailed view taken in the direction of the arrow VII of FIG. 6.

The embodiment of FIGS. 6 and 7 differs from that described above solely by the method by which the forces are transmitted from the cylinder 9 to wedge 8. What happens is that the link 10 is of circular cross-section and the recess 19, instead of emerging on the face 4 of the platen, is a bore for guiding this link, pierced horizontally from the lateral face 20 of the platen.

The clevis 29 of the wedge is replaced by a horizontal slit 29A, which is open towards the inside of the platen, and which includes a narrow outer part 37 and a wide inner part 38. The corresponding end of the link 10 has a neck 39 and a widened head 40 which are designed to be slidingly received in the parts 37 and 38 respectively of the slit of 29A.

Thus, during the to-and-fro displacements of the link, the wedge can run up and down the length of the incline 24 of the block 7.

The coupling between the link 10 and the cylinder rod 30 is similar to that described above between this same link and the wedge 8.

I claim:

1. Device for clamping a half-mold (2) onto a platen (1) of a molding machine, comprising a peg (6) which projects from the half-mold and which is received in a recess (17) in the platen, and a clamping mechanism (5) including a transverse cylinder (9) operatively associated with a wedge (8) designed to interact with the peg in order to removably clamp the half-mold onto the platen, the clamping mechanism (5) comprising a bearing block (7) removably fixed at an entrance of the recess (17) and including a passage (25) for the peg (6) and an incline (24) for the bearing of the wedge (8), said incline being provided on a face of the block which points towards the recess in the platen, the peg (6) being axisymmetric and including a widened head (14) on an inner face (15) of which the wedge acts.

2. Device according to claim 1, wherein the passage (25) of the bearing block (7) is offcentered with respect to the block on a side of the block which is closest to a central axis of the platen (1).

3. Device according to claim 1, wherein the wedge (8) has the form of a fork which is open towards a central axis of the platen (1).

4. Device according to claim 1, wherein the clamping mechanism (5) includes a link (10) articulated to a piston rod (30) of the cylinder (9) and to the wedge (8).

5. Device according to claim 1, wherein the clamping mechanism (5) includes a link (10) which is slidingly guided in the platen and of which an end opposite from the cylinder (9) is slidingly mounted in a slit (29A) in the wedge (8), said slit being perpendicular to a longitudinal axis of the link.

6. Device according to claim 1, wherein the bearing block (7) has a circular cross-section and fits into a conjugate counterbore (18) in the platen (1).

7. Device according to claim 1, wherein the clamping mechanism (5) is entirely contained within a thickness of the platen (1).

8. Device according to claim 1, wherein a piston rod (30) of the cylinder, or a member which is translationally connected thereto, includes an index (31) situated outside of the contour of the half-mold (2) and visible by looking at the platen (1).

9. Molding machine for the injection-molding of a plastic, comprising at least one platen (1) which includes at least one clamping device (5) comprising a peg (6) which projects from a half-mold and which is received in a recess (17) in the platen, and a clamping mechanism (5) including a transverse cylinder (9) operatively associated with a wedge (8) designed to interact with the peg in order to removably clamp the half-mold onto the platen, the clamping mechanism (5) comprising a bearing block (7) removably fixed at an entrance of the recess (17) and including a passage (25) for the peg (6) and an incline (24) for the bearing of the wedge (8), said incline being provided on a face of the block which points towards the recess in the platen, the peg (6)

being axisymmetric and including a widened head (14) on an inner face (15) of which the wedge acts.

10. Molding machine according to claim 9, wherein the passage (25) Of the bearing block (7) is offcentered with respect to the block on a side of the block which is closest to a central axis of the platen (1).

11. Molding machine according to claim 9, wherein the wedge (8) has the form of a fork which is open towards a central axis of the platen (1).

12. Molding machine according to claim 9, wherein the clamping mechanism (5) includes a link (10) articulated to the piston rod (30) of the cylinder (9) and to the wedge (8).

13. Molding machine according to claim 9, wherein the clamping mechanism (5) includes a link (10) which is slidingly guided in the platen and of which an end opposite from the cylinder (9) is slidingly mounted in a slit (29A) in the wedge (8), said slit being perpendicular to a longitudinal axis of the link.

14. Molding machine according to claim 9, wherein the bearing block (7) has a circular cross-section and fits into a conjugate counterbore (18) in the platen (1).

15. Molding machine according to claim 9, wherein the clamping mechanism (5) is entirely contained within a thickness of the platen (1).

16. Molding machine according to claim 9, wherein a piston rod (30) of the cylinder, or a member which is translationally connected thereto, includes an index (31) situated outside of the contour of the half-mold (2) and visible by looking at the platen (1).

* * * * *